(No Model.) 3 Sheets—Sheet 1.
S. D. FIELD.
CONDUIT FOR ELECTRIC RAILWAYS.
No. 380,103. Patented Mar. 27, 1888.
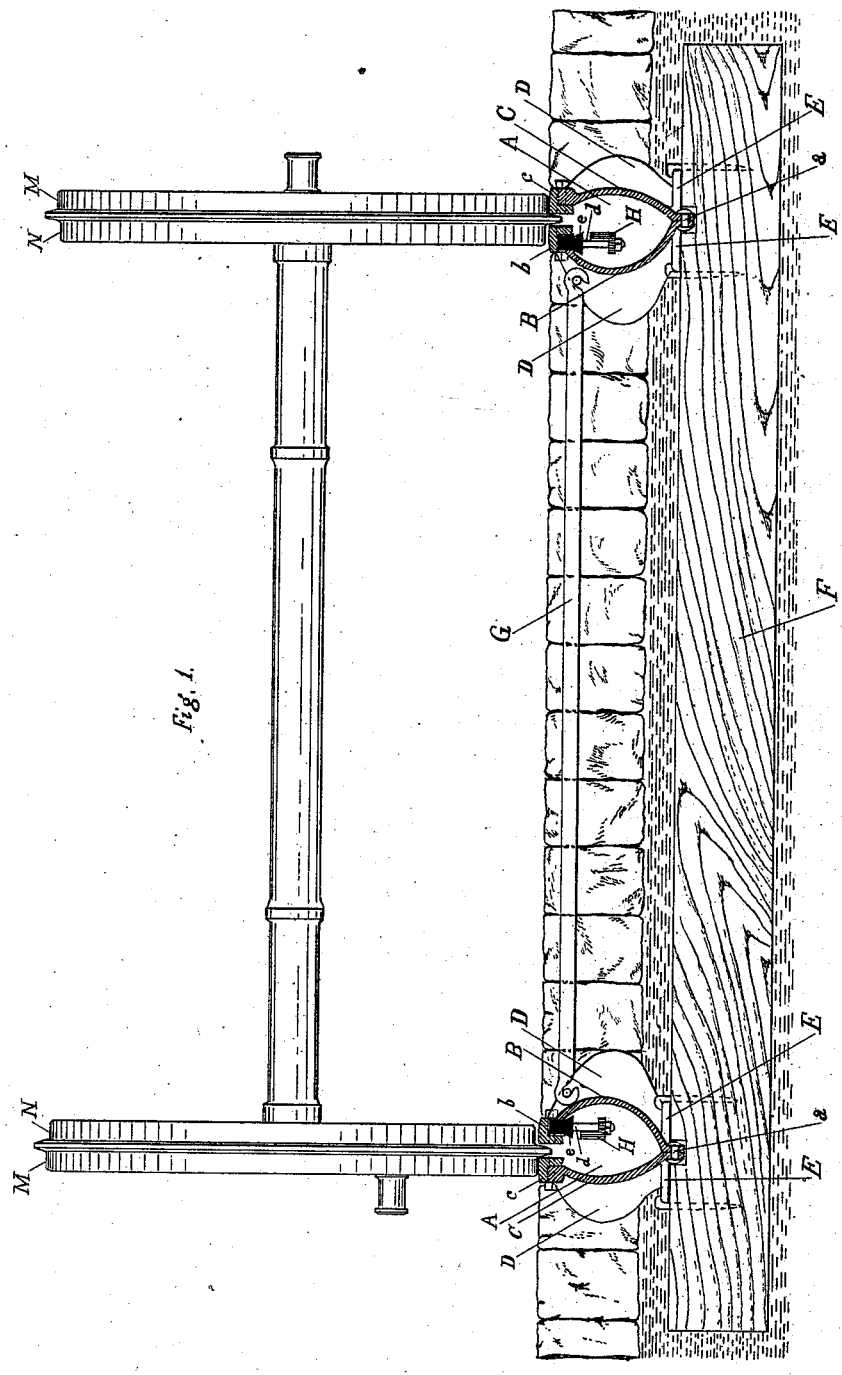
WITNESSES
David E. Lain.
E. L. French.
INVENTOR
Stephen D. Field,
By Fowler & Fowler Attys

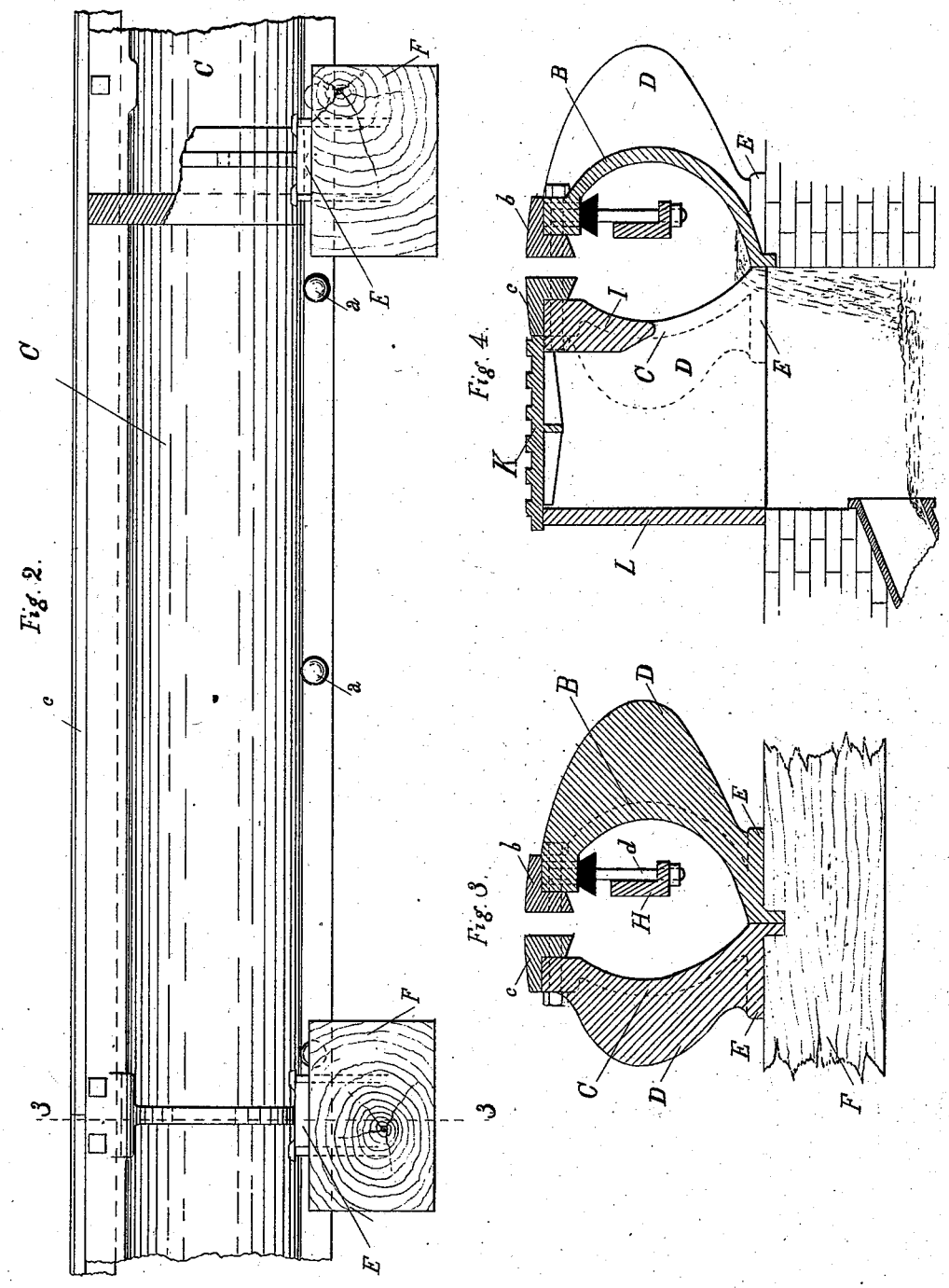

(No Model.) 3 Sheets—Sheet 3.

S. D. FIELD.
CONDUIT FOR ELECTRIC RAILWAYS.

No. 380,103. Patented Mar. 27, 1888.

WITNESSES
David E. Lain.
E. S. French.

INVENTOR
Stephen D. Field
By Fowler & Fowler Attys.

UNITED STATES PATENT OFFICE.

STEPHEN DUDLEY FIELD, OF YONKERS, NEW YORK.

CONDUIT FOR ELECTRIC RAILWAYS.

SPECIFICATION forming part of Letters Patent No. 380,103, dated March 27, 1888.

Application filed March 17, 1887. Serial No. 231,254. (No model.)

*To all whom it may concern:*

Be it known that I, STEPHEN DUDLEY FIELD, a citizen of the United States, residing at Yonkers, in the county of Westchester and State of New York, have invented certain new and useful Improvements in Conduits and Devices for Electric Railways, of which the following is such a full, clear, and exact description as will enable any one skilled in the art to which it appertains to make and use the same, reference being had to the accompanying drawings, forming part of this specification.

The object of my invention is to cheapen the cost in construction of conduits for electrical railways and to improve the details of an electrical railway so that improved results can be attained.

The invention consists of a braced ribbed conductor, preferably of copper, supported within a conduit for conveying the current, and in having two conduits, one beneath each rail, the said conduits having conductors therein, the circuit of which conductors is completed through the motor upon the car in any desired manner; and the invention further consists in certain details of construction, which will now be described in full, and pointed out in the claims annexed hereto.

Figures 5, 7:
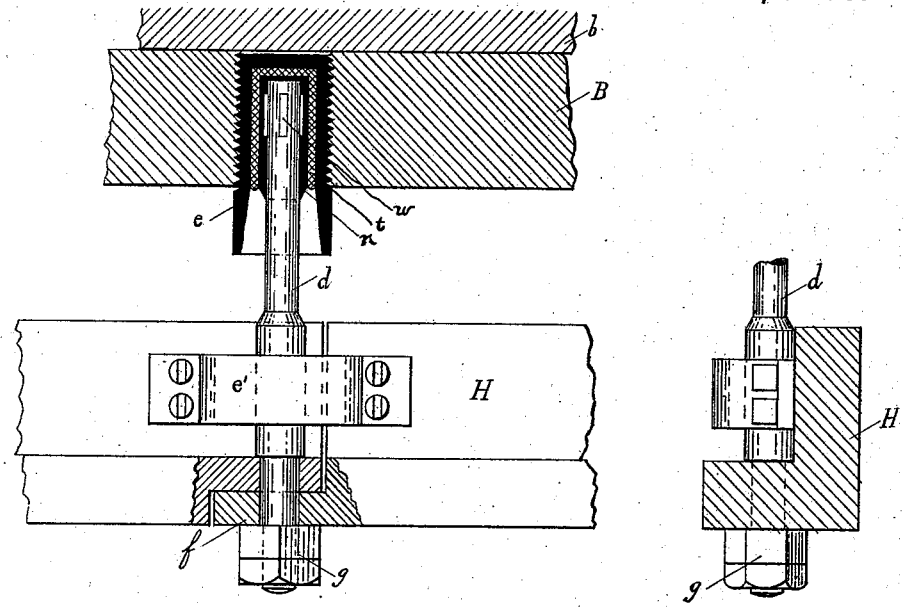
Figure 6:
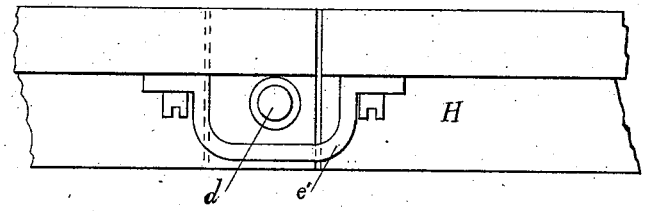

Figure 1 is a sectional view of my conduits and combined rail with a pair of wheels adapted thereto having a differential tread. Fig. 2 is a side elevation of my conduit; Fig. 3, a cross-section on the line 3 3 of Fig. 2; Fig. 4, a cross-section of the conduit and rail at a catch-pit, showing a drain leading therefrom; Fig. 5, a rear elevation, partly in section, of my braced ribbed conductor and the means for supporting the same from the combined rail and conduit; Fig. 6, a plan view of the braced ribbed conductor, and Fig. 7 a sectional view thereof near one of the braces and supports.

The same letters of reference indicate the same parts throughout the several views of the drawings.

A A designate two conduits, which are preferably made of two parts or sections, B and C, fastened together at their overlapping parts by rivets *a a*. The sections B C of the conduit are provided with ribs D for stiffening the same and affording means for holding the conduit in place, which are provided with flanges E E, which may be cast integral therewith. The flanges rest upon sleepers F, being spiked to the same in any ordinary manner, the ties F having been previously grooved to receive the riveted overlapping part of the conduit. At the ribs of the conduit a bar, G, is provided for tying the two conduits together, and may be hooked over pins cast or attached to said ribs. (Shown in Fig. 1.) This construction of conduit, which I have described, may be varied without departing from my invention, and I do not wish to confine myself to the specific construction just described, for the same is capable of much variation.

I face the parts B C of the conduit that are near the level of the way with steel facings *b c*, which break joint with the joints of the conduit located at each cross-tie F. This forms a slot between the facings for the plow-arm carried by the car to make contact with the insulated conductor within the conduits, and also forms a groove for the flange of the wheel to travel in, thus subserving a double function.

The invention may be said to consist in providing two conduits of the character just described, one directly beneath each rail, each carrying its own conductor, for the purpose to be hereinafter described. So far as I am aware, I am the first to make use of such a disposition of conduits. I design to have the conduits made in sections of any desired length, and when the two parts of a conduit are riveted together they can be joined together like pipes, the one section passing into the other section for a slight distance and being fastened together at such a joint in any way desired, the conduits being constructed to permit of such an arrangement. Such a joint is shown in Fig. 2 at the right hand thereof.

In Fig. 3 is illustrated a section of a conduit through a rib, showing the walls thereof in dotted line.

In Fig. 4 is shown a sectional view of the conduit at a catch-pit. In this construction an aperture is cut in the outer wall of the conduit to permit the passage of any water or dirt to the catch-pit, which can be connected with a sewer. To this catch-pit is arranged a man-hole which is provided with a cast-iron cover, K, supported at one side by a plate or wall, L, of the man-hole, and at the other side by a piece, *l*, of the conduit-wall C.

I have shown in Fig. 1 a pair of wheels with a flange intermediate of the two threads thereof, which wheels are adapted for my track $b\ c$, but not specially so, as almost any form of wheel can be used with such a track. The diameter of the tread N is less than the diameter of the tread M, upon which latter the car is adapted to travel ordinarily. In rounding a curve, however, the differential action of the wheel is adapted to come in play, and I design to have the track-facing $b$ slightly raised when its wheel has to travel over the short curve in making the turn, so that the facing $b$ will be traveled over by the tread N upon the short curve, and the tread M and facing $c$ left in contact, as before, for the wheel having the longer or outer curve to travel over, the facing $b$ on the long curve being left undisturbed and remaining at the level shown in the drawings. This gives rise to a differential action, the wheel of larger diameter and longer periphery having to pass over the longer curve and the wheel of less diameter and shorter periphery passing over the shorter curve, thus preventing the dragging of the wheel which passes over the curve of greater length. I make no claim to this feature, as the same has been used heretofore.

In Fig. 5 I have shown in detail my ribbed copper conductor and the means for supporting the same from the top of the conduit, Figs. 6 and 7 representing, respectively, a plan view and cross-section of said conductor at one of its joints. The conductor and means for supporting the same from the conduit are also shown in Figs. 1, 3, and 4. The conductor H is preferably made of copper, and is ribbed or L-shaped in cross-section, the area of which should be about one inch, offering a resistance of about one ohm for every ten miles of conductor. It is supported at stated intervals by a steel rod, $d$, which is supported from the section B of the conduit by means of a screw-threaded cylinder, $e$, of insulating material, into which the rod $d$ is inserted and held. Within the cylinder $e$, which is of hard rubber, is a lining of soft rubber, $t$, which is vulcanized to cylinder $e$, and a hard-rubber covering, $n$, cast upon the end of the rod $d$, to which covering $n$ the rod is held by projecting pieces $w$.

The conductor H is to be made in certain lengths, and cut away and having an extension at $f$, (see Fig. 5,) so that the two portions can be joined together, as illustrated in this figure, so as to secure a good contact. To insure the continuity of the circuit being preserved at every joint, I place a brace, $e'$, around the rod $d$ at the back of the conductor. The brace is securely bolted to the conductor, and is an extra precaution taken to maintain the circuit where the conductor is joined. A joint will fall at every few supports $d$, and the parts be held together by nut $g$ upon the end of the rod $d$ forcing the conductor against a shoulder upon the same. Where there is no joint, the rod $d$ passes through the horizontal or rib portion, and supports the conductor by the means of the nut $g$. The construction of this part of my invention could of course be varied, and would naturally suggest itself to any one upon seeing my construction. I do not limit myself, therefore, to the precise construction set forth.

It will be obvious from the construction described that the conductor H can be reversed—that is to say, the horizontal portion substituted for the vertical portion when the latter becomes worn by the friction of the contact-maker carried by the car.

So far as I am aware I am the first to make use of two conduits, one directly beneath each rail, each having a conductor, for the purpose of completing the circuit from the conductor in one conduit to that of the other conduit. I design to have said conductors, the one at one end of the line and the other at the other end of the line, connected, respectively, with positive and negative poles of two independent generators, which are suitably connected to the conduits by their other poles. This, however, forms no part of the present invention, as the same has been fully described and claimed in another application filed of even date herewith, Serial No. 231,255.

The street can be paved where my invention is employed in the ordinary manner, the ribs D and the connecting-rod G merely registering with a joint in the paving, as shown in Fig. 1, and the paving can be made flush with the surface of the rail, so that my system offers no obstruction whatever in the roadway, not as much as the ordinary tram-car railway, as my rails are flat and flush with the surface, as before noted, the only thing being noticeable is two small slots running lengthwise of the track-rails and not of sufficient width to interfere in any way with traffic.

It will be observed that the two sections or halves of my conduit are not symmetrical, and that on the straight parts of the track the section C supports the weight of the car by means of the tread M, which rests upon the facing $c$ of the section C. This section C, I therefore do not curve as much as the other one, B, so that it is adapted to withstand the pressure. It might also be made a little heavier than the section B, if required. The total cost of building a railway such as I have described will be considerably less than one-third the cost of constructing a cable railway or an electrical one having a conduit midway of the rails.

Having now fully described my invention, I wish to have it understood that I do not limit myself to the construction set forth, as the same may be varied in many ways without departing from the spirit of my invention, and I reserve to myself all changes and variations that come within the scope of my invention, and the right to make any change in practice that falls within the scope of what I now desire to claim as new and secure by Letters Patent of the United States, which is—

1. An electrical railway having two conduits, one directly under each rail, with a slot in the same for each conduit, and a conductor in each of said conduits, for the purpose described.

2. An electrical railway having two conduits, one directly beneath each rail and within the interior of the supporting-walls of the same, with a slot in said rail for the conduit, the same forming a combined rail and conduit, for the purpose described.

3. A railway having a combined rail and conduit composed of two sections, substantially as B C, one of less curve than the other, substantially as and for the purpose described.

4. A railway having a conduit constructed in two curved sections, substantially as B C, fastened together at their bottom and ribbed at intervals, for the purpose described, and facings for the exposed portions of said conduit, forming a rail of the track with a slot between the same for the conduit.

5. A railway having a rail and conduit constructed in two sections, substantially as B and C, one of less curve than the other and ribbed at intervals, substantially as and for the purpose described.

6. A conduit constructed in curved sections or halves B C, suitably fastened together, the said sections being ribbed at intervals, and provided with a flange for supporting said conduit upon a tie beneath the same, and facings for the two sections of the conduit forming the rail of a track with a slot between the same, subserving the functions set forth.

7. A combined conduit and rail consisting of two continuous metallic sections, substantially as B C, suitably fastened together and ribbed at intervals, the exposed portion of said conduit forming one rail of a track, another similar conduit forming the other rail, and a connecting-bar bracing said conduits together.

8. A conduit for electrical railway purposes made of two curved sections, substantially as B C, joined together at their bottom, the exposed portions of which conduit forms one of the rails of a track with a slot between the same for the conduit, and an insulated conductor supported therein, for the purpose described.

9. The combination, as hereinbefore set forth, of a conductor, a conduit or other object from which said conductor is supported, rods for sustaining said conductor, having projecting pieces over which a hard-rubber covering is cast, and a screw-threaded cylinder of hard rubber adapted to be fastened to said conduit or other object, having a soft-rubber lining which is vulcanized to secure the covering cast upon the end of said rod to the aforesaid cylinder, and thereby support and insulate said conductor.

10. An L-shaped copper conductor, braces at the back thereof around the joints in the same, a conduit, and rods for supporting the said conductor from the conduit, substantially as and for the purpose set forth.

11. A reversible L-shaped conductor, as H, and braces $e'$ around the joints of the same, rods, as $d$, for supporting the conductor at intervals from the wall of the conduit B, and insulating screw-threaded cylinders for securing the latter to the conduit.

12. The combination of the L-shaped conductor H, cut away and extended at $f$, as shown and described, braces, as $e'$, for the same, and rods, as $d$, passing through the ribbed or horizontal part for supporting the same, substantially as described.

13. An L-shaped conductor, as H, cut away and extended, as shown at $f$, a rod, as $d$, which passes through the rib or horizontal part thereof, a nut, $g$, or other means for fastening the same to the rod $d$ and keeping the parts of the conductor in intimate contact at a joint, a brace, as $e'$, around said rod at the back of the conductor, serving as an additional means for keeping the continuity of the circuit of the conductor intact where the same is joined, and a screw-threaded plug, as $e$, of insulating material, for sustaining the supporting-rod $d$ and insulating the same from the wall of the conduit B.

In testimony whereof I have hereunto set my hand and seal, this 15th day of March, 1887, in the presence of two subscribing witnesses.

STEPHEN DUDLEY FIELD. [L. S.]

Witnesses:
A. C. FOWLER,
CHAS. D. FOWLER.